C. BIESEL.
EXTRACTING METALS FROM ORES.
APPLICATION FILED JAN. 9, 1917.
1,276,162. Patented Aug. 20, 1918.
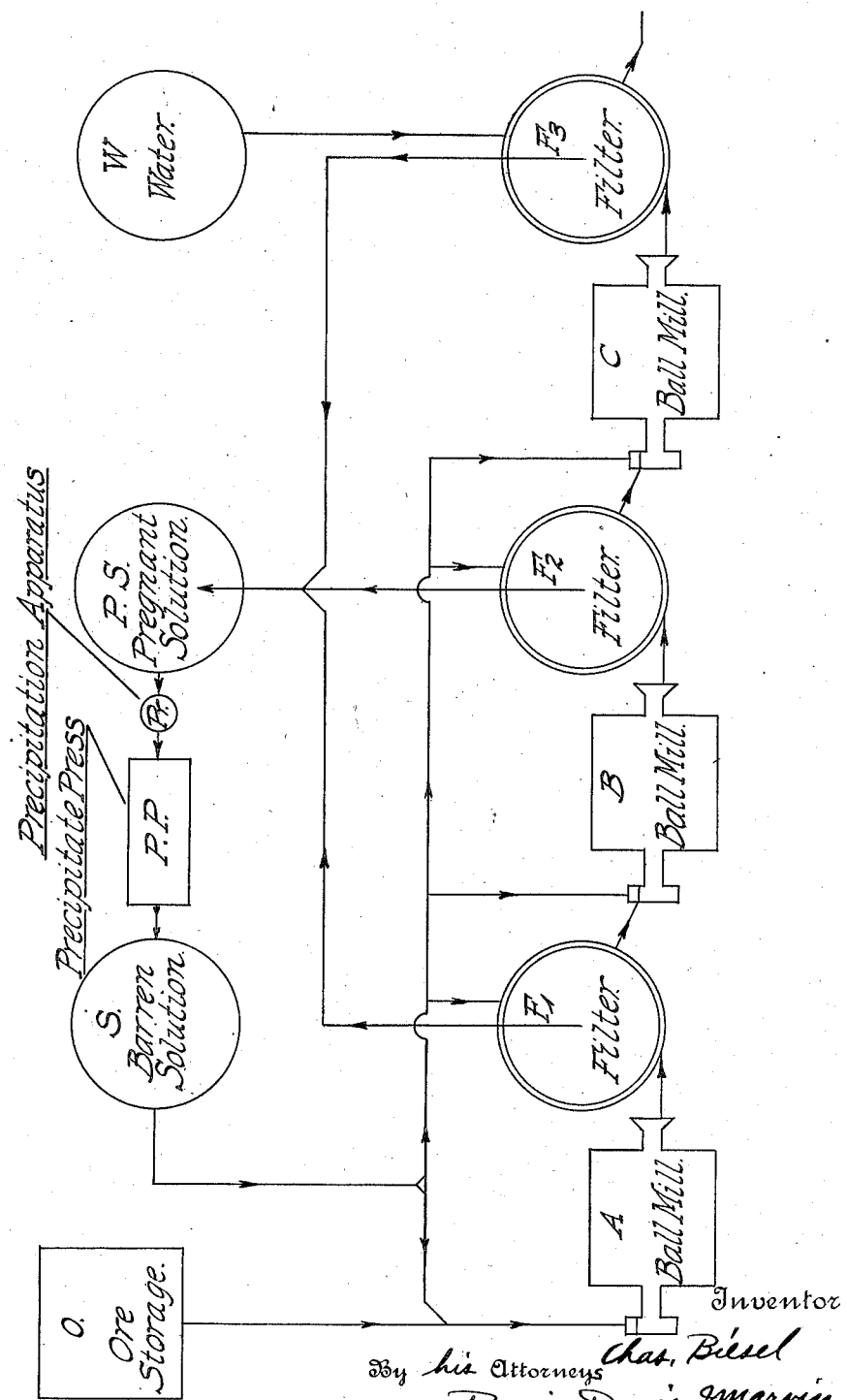

UNITED STATES PATENT OFFICE.

CHARLES BIESEL, OF EL PASO, TEXAS.

EXTRACTING METALS FROM ORES.

1,276,162. Specification of Letters Patent. Patented Aug. 20, 1918.

Application filed January 9, 1917. Serial No. 141,367.

*To all whom it may concern:*

Be it known that I, CHARLES BIESEL, a citizen of the United States, residing at El Paso, county of El Paso, State of Texas, have invented certain new and useful Improvements in Extracting Metals from Ores; and I do hereby declare the following to be a full, clear, and exact description of the invention, such as will enable others skilled in the art to which it appertains to make and use the same.

This invention relates to the extraction of soluble metal values from ores; and more particularly to the extraction and recovery of such values by an improvement in the cyanid process.

It has heretofore been the general practice, so far as known to me, in order to facilitate the extraction of soluble metal values, to crush the ore to fine sands or slimes if necessary and to subject these sands or slimes to additional treatment in order to complete the extraction of soluble metal values. I have discovered that if the ore is partially crushed in the solvent and the resulting pregnant solution removed to a substantially complete degree and the partially crushed and impoverished ore recrushed in new solvent, and this procedure repeated and continued until the ore has been reduced to sands or slimes, as intended, the extraction of metal values can be so effectively completed that it is not necessary to subject the final sands or slimes to additional treatment for the further extraction of metal values. By new solvent, I mean such liquid or solution as is substantially free from such metal values as the process is aiming to extract from the ores, and by pregnant solution I mean such liquid or solution as carries, in commercial quantities, such dissolved metal values as the process aims to extract from the ores.

The present invention therefore, comprises such an improved method and apparatus according to which the ores or concentrates or other similar materials are crushed in stages, and a fresh solution applied to each succeeding cycle or stage with removal of the pregnant solution by filtering at each stage. The novel method of the present invention may be considered a multiple cycle or multiple stage process for the extraction of the metal values, the several cycles or stages being successive in order and, to a certain extent, independent of each other.

In practising the improved process of my present invention, the ore in contact with new solvent first enters the first crushing stage. During the contact of the ore with the solvent in the first crushing stage, a part of the soluble metal values are dissolved. The resulting pregnant solution, to a substantially complete degree, is freed from the partly impoverished ore and replaced by new solvent, in any suitable way or manner. The freed pregnant solution may be brought to the condition of new solvent and then used again in this process as such. The impoverished ore in contact with the necessary quantity of new solvent is then brought to the head of the second cycle, which consists of further crushing the ore in solvent, of accomplishing additional extraction, of replacing the pregnant solution with new solvent, and of returning the still further impoverished ore in contact with the necessary quantity of new solvent to the head of the succeeding cycle. The replacement of pregnant solution after the last crushing stage and in the last cycle can be accomplished by water if desired.

The novel method may include any number of such cycles or stages, at the will of the operator, or in accordance with the material treated or the results desired. The separate cycles or stages are closely related both on account of the passage of the ore or pulp to be treated from one cycle or stage to another, and on account of the movement or flow of the solutions. So also, the various appliances and apparatuses themselves used in the different stages may be of the same or similar construction, as will be more fully hereinafter pointed out.

It is an object of the present invention to effect the extraction of metal values much more rapidly than has been possible by any process heretofore followed that is known to me. It is a further object of the invention to effect the extraction of the maximum amount of metal values with a minimum loss of value in the tailings. Still other objects of the invention comprise greatly simplifying the flow-sheet and effecting a very material reduction in plant installation costs, as well as in operating costs. Other objects of the invention will appear from the more detailed description of the invention.

In the accompanying drawing, there is illustrated in diagram a flow sheet illustrative of the invention, and an arrangement of apparatus by means of which the improved process of the invention can be carried out.

Referring to this drawing, it will be noted that there are three ball mills or other appropriate form of crushing or reducing apparatus indicated at A, B and C; and that three filters or de-hydraters are also provided indicated respectively at $F_1$, $F_2$, $F_3$. The ore storage is indicated at O, while storage tanks for the barren solution, the pregnant solution, and water, are indicated respectively at S. PS. and W. The precipitating tank or apparatus and a filter or filter-press or precipitating press are indicated respectively at Pr. and P.P. The circulation or flow takes place in the manner indicated by the arrows.

For the purpose of illustrating the operation which takes place in the apparatus illustrated, and the process of the invention, I will assume that the ore to be treated carries 20 ounces of silver per ton; and that the silver is to be extracted by the cyanid process. For purposes of illustration, I will also assume figures illustrating the amounts of solutions and of ore as well as the amounts of extraction obtained during the successive steps of the process; but I desire it to be understood that I assume these various elements and figures merely for purposes of illustration, and that wide variations are possible from the quantities and figures given, depending upon the values, upon the metals themselves, upon the character of the ore, upon the style of apparatus adopted in carrying out the process, and upon other considerations. I will further assume, for purposes of illustration, that run of mine ore is used which has passed through a first coarse crushing stage and has been crushed to suitable or customary size, as by means of a crusher or rolls.

The following description is based upon the assumptions which I have referred to, and is also intended to be illustrative. 200 tons of ore, assaying 20 ounces of silver per ton and carrying a total of 4000 ounces of silver, are fed from the ore storage O, together with 133 tons of barren solution from the storage tank S, into the ball mill A. In this ball mill the ore is reduced to, for example, 10 mesh; and during this process of grinding or reducing, the cyanid solution exercises its dissolving action and the values in the ore are partially dissolved. The operation is thus a combined grinding and extracting action resulting in the reduction in size of the ore and the partial dissolving of the values from the ore. During the crushing or grinding, violent agitation, as well as efficient aeration of the pulp takes place. I will assume that 50% of the values are dissolved so that the discharge from the ball mill, or equivalent grinding or reducing apparatus, contains 200 tons of ore carrying 2000 ounces of silver, and 133 tons of pregnant solution carrying 2000 ounces of silver. This pregnant solution, not considering original moisture present in the ore pulp, will contain 15 ounces of silver per ton of solution.

From the ball mill A, the mixture of ore pulp and solution goes to the filter or de-hydrater $F_1$, where the ore pulp is de-hydrated to, for example, 10% moisture. This moisture, which is made up of the pregnant solution, is displaced by the fresh or barren cyanid solution during the operation of the filter so that practically the entire pregnant solution which has thus far been made is available for precipitation, that is to say, about 133 tons of pregnant solution carrying 2000 ounces of silver. The pregnant solution goes to the storage tank P. S., then through the precipitation apparatus Pr. and the precipitate-press or filter-press P.P. where the silver is precipitated and removed from the solution leaving the barren solution which flows to the barren solution storage tank S and is there maintained of the proper strength of a working solution.

The discharge from the filter $F_1$ consists of the cake carrying say 20 tons of the barren solution and goes to the ball mill B together with say 180 tons of additional barren solution. In this second ball mill the pulp is again ground in solution to say 80 mesh, being agitated and aerated at the same time. This second crushing stage is likewise a combined crushing and extracting stage so that additional extraction of metal values takes place as well as further reduction in size of the ore particles. I will assume that a further extraction of 50% takes place so that the discharge from B will contain 200 tons of ore carrying 1000 ounces of silver and 200 tons of pregnant solution carrying 1000 ounces of silver or 5 ounces of silver per ton of solution.

The discharge from B goes to the filter or de-hydrater $F_2$ where de-hydration of the pulp takes place to say 15% moisture. This moisture, which consists of pregnant solution, is displaced by barren solution during the operation of the filter so that practically the entire pregnant solution resulting from the operation in B is available for precipitation, that is, about 200 tons of pregnant solution carrying 1000 ounces of silver. This pregnant solution likewise goes to the storage apparatus P.S. and then through the precipitation and filtration steps where it is converted into barren solution which passes to the storage apparatus S, and is there maintained of proper working strength. That is to say, the cycle of operations which takes place in B and $F_2$ is similar to that which takes place in A and $F_1$.

The discharge from the filter $F_2$ which consists of the cake carrying say 30 tons of barren solution goes, together with say 270 tons of additional barren solution, into the ball mill or equivalent crushing apparatus C where it again undergoes additional grinding to, for example, minus 200 mesh, with accompanying aeration and agitation and with resulting additional extraction. I will assume that 800 ounces of silver is additionally extracted so that the discharge from C contains 200 tons of ore containing 200 ounces of silver and 300 tons of pregnant solution carrying 800 ounces of silver or 2.66 ounces of silver per ton of solution.

The discharge from C is treated in a manner similar to the discharge from A and B; that is to say, it is filtered in a filter $F_3$ to say 25% pregnant solution, which is displaced by water from the storage apparatus W during the operation of the filter. Hence, practically the entire pregnant solution formed in C is made available for precipitation, namely, 300 tons of pregnant solution carrying 800 ounces of silver. This pregnant solution from $F_3$ is treated and stored in a way similar to that from $F_2$.

It will thus be seen that the cycle of operations which takes place in C and $F_3$ is similar to the cycles which take place in A and $F_1$, and in B and $F_2$, with the exception that the pregnant solution is displaced by water instead of by the fresh or barren solution.

Instead of three cycles, it will be evident that any number of cycles can be similarly interposed. From the last cycle and the last filtering operation, the material goes to the tailings discharge. Thus, the discharge from $F_3$ which is a cake say carrying 50 tons of water, goes to the tailings dump.

As above stated, the procedure is one which involves a plurality of cycles during each of which the ore is subjected to a combined crushing and extracting stage and to a subsequent filtration or de-hydration for the separation of the pregnant solution from the ore. In the arrangement of apparatus, the grinders or crushers alternate with the filters while all extraction takes place during the crushing and filtering operation. No separate and expensive tank treatment plant is thus required.

It will thus be seen that in accordance with the improved process of my present invention, the crushing of the ore is divided into a number of separate stages. By this I mean that before the ore has been crushed to the final required degree of fineness, the ore particles are reduced in separate operations to several intermediate sizes. Thus, in the example just given as an illustration, the first separate crushing operation reduces the ore to about 10 mesh size, the second separate crushing operation reduces the ore to about 80 mesh size, and the third separate crushing operation reduces the ore to about 200 mesh size. Each of these separate crushing operations or stages forms a part of a treatment cycle. A treatment cycle consists of one separate crushing operation or stage of the ore in the presence of the necessary amount of suitable solvent and in the dissolving of metal values during the contact of the solvent with the ore, and in the replacement, to a substantially complete degree, of the resulting pregnant solution by new solvent and the return of the impoverished ore in contact with the required amount of new solvent to the succeeding separate crushing operation or stage. The number of the succeeding treatment cycles depends on how many intermediate mesh sizes of ore the operator considers necessary for extraction prior to the last or final cycle. The crushing of the ore in separate stages in the presence of new solvent facilitates the extraction of the metal values by progressively presenting freshly exposed ore surfaces to new solvent, and further results in effecting the extraction of such values without unduly increasing the volume of liquid required to do efficient crushing.

Moreover, according to the present invention a minimum of time is required for the treatment, and the pregnant solution can be removed practically as soon as made, and fresh or new or barren solutions repeatedly applied to the pulp, with resulting acceleration of the extraction.

The crushing and extracting cycles can be repeated as many times as desired, thus making the process applicable to ores differing from each other in character, and making it possible to obtain successive extractions of any desired number depending upon the commercial rapidity of extraction in each individual cycle.

Moreover, with ores containing copper and lead, a concentration process can be interposed between any two cycles or treatments.

With the process of the present invention, no classification of the pulp is required, closed circuits and their attendant expense and inconvenience being thus done away with, mechanical losses are reduced to a minimum and the working and stock solutions are active throughout, thus reducing the quantity necessary and the apparatus necessary for their storage and circulation. This reduced solution tonnage necessarily also effects a saving in the precipitant medium as well as in the pumping and re-handling of the solution, and in the quantity of cyanid which is tied up in the solution, excessive quantities of cyanid being thus avoided.

The entire extraction, according to the present invention, can be effected during the crushing and filtering operations, the time required for solution contact of the cyanids with the ore being reduced and the exposure of cyanid to possible cyanicides of the ore being shortened, with resulting saving in cyanid consumption. Effective agitation and aeration takes place during the grinding so that separate agitators or aerators are not required. Metallics are flattened during the grinding operation and thus made susceptible to solution; while the continued grinding and reduction in size of the particles continuously exposes fresh surfaces of the ore to the dissolving action of the cyanid solution. No concentration is necessary on ordinary gold-silver ores, in order for these ores to be treated according to the present invention, but it will be understood that the invention is applicable to concentrates as well as to unconcentrated ores.

Because of the simplicity of apparatus and treatment involved in the present invention, shut-downs are reduced to a minimum and a complete clean-up can be accomplished in a short time.

Having thus described my invention, what I claim is:

1. The method of extracting soluble metal values from ores, which comprises crushing the ore in successive stages and subjecting the ore progressively to fresh extraction at each stage; substantially as described.

2. The method of extracting soluble metal values from ores, which comprises subjecting the ore to a combined crushing and extraction to effect a reduction in size of the ore and solution of values therefrom, removing the extracted values from the ore and subjecting the ore to a further combined crushing and extraction in the presence of fresh amounts of solvent; substantially as described.

3. The method of extracting soluble metal values from ores, which comprises subjecting the ore to a series of successive crushing and extraction operations by crushing the ore in the presence of a solvent, removing the solution after each crushing and extraction operation and supplying fresh amounts of the solvent in the next successive operation; substantially as described.

4. The method of extracting soluble metal values from ores, which comprises subjecting the ore to a combined crushing and extracting operation, and thereby agitating and aerating the pulp and extracting metal values from the freshly crushed ore, separating the solution from the ore pulp after the crushing and extracting operation, recovering the metal values from the solution, and subjecing the ore to a further crushing operation in the presence of fresh solvent; substantially as described.

5. The method of extracting soluble metal values from ores, which comprises subjecting the ore to a plurality of crushing operations in a ball mill, in the presence of a solvent, thereby effecting agitation and aeration of the pulp and extraction of the freshly crushed particles, removing the solution from the pulp and adding fresh amounts of the solvent for the next crushing operation; substantially as described.

6. The method of extracting metal values from ores, which comprises partially crushing the ore in the presence of a solvent, removing to a substantially complete degree the resulting pregnant solution, and again crushing the resulting partially crushed and impoverished ore in the presence of fresh solvent and removing to a substantially complete degree the resulting pregnant solution; substantially as described.

7. The method of extracting silver from ores, which comprises crushing the ore in the presence of a cyanid solution and thereby reducing the ore in size and dissolving the silver in the cyanid solution, filtering off the solution, adding fresh amounts of the cyanid solution, and subjecting the ore to a further combined crushing and extraction operation and thereby further reducing the ore in size and dissolving further amounts of silver in the cyanid solution, and recovering the silver from the solutions thus produced; substantally as described.

8. The method of extracting silver from ores, which comprises subjecting the ore to a plurality of successive crushing operations in the presence of a cyanid solution, and thereby progressively reducing the ore in size and successively extracting further amounts of silver, removing the solution after each operation, and supplying fresh amounts of the cyanid solution for the successive operations; substantially as described.

9. The method of extracting silver from ores, which comprises crushing the ore in a ball mill in the presence of a cyanid solution and thereby agitating and aerating the ore and reducing the size of the particles and extracting the silver therefrom, separating the solution from the ore, adding further amounts of the cyanid solution, and repeating the operation and thereby further reducing the size of the particles and extracting further amounts of silver; substantially as described.

10. The method of extracting silver from ores, which comprises crushing the ore in a plurality of successive stages in the presence of a cyanid solution and thereby reducing the size of the ore and dissolving the silver therefrom, separating the solution after each stage, adding fresh amounts of the cyanid solution for the successive stages, separating the silver from the solutions and thereby forming barren solutions and using such barren solutions with suitable additions of cyanid thereto for further crushing and extracting operations; substantially as described.

11. The method of extracting soluble metal values from ores, which comprises crushing the ore in successive stages and in the presence of a solvent solution and thereby subjecting the ore to a series of progressive crushings and extractions, separating the solution after each crushing and extraction operation, separating from the solution the metal values carried thereby, thus regenerating a barren solution, and utilizing such barren solution with suitable further additions of the solvent in further crushing and extraction operations; substantially as described.

12. The method of extracting soluble metal values from ores with cyanid solutions, which comprises crushing the ore in stages and in the presence of the cyanid solution and thereby effecting progressive crushings of the ore and extractions of the metal values therefrom, filtering from the ore after each crushing and extraction operation the solution formed thereby, displacing the solution remaining with the ore pulp by a fresh cyanid solvent and thereby recovering additional amounts of the solution, and finally replacing the solvent after the last crushing and extracting and filtering operation, with water; substantially as described.

13. The method of extracting soluble metal values from ores with cyanid solutions, which comprises crushing the ore in stages and in the presence of a cyanid solution and thereby effecting progressive crushing and extraction operations, removing from the ore after each such operation the solution formed thereby, recovering from such solutions the metal values carried thereby and thus forming barren cyanid solutions, adding with such barren solutions further amounts of cyanid to maintain them of the proper strength, and utilizing such barren solutions in further crushing and extraction operations; substantially as described.

14. An improved apparatus for extracting soluble metal values from ores comprising a series of crushing devices for crushing the ore in the presence of a solvent liquor, means for removing from the ore after each such crushing operation the solution formed, and means for supplying fresh amounts of the solvent liquor for each crushing operation, whereby the ore is subjected to a series of combined crushing and extraction operations with progressive reduction in size of the particles of the ore and progressive leaching of the values therefrom; substantially as described.

15. An improved apparatus for extracting soluble metal values from ores, comprising a series of ball mills adapted for subjecting the ore successively to combined crushing and extraction operations, a series of filters or de-hydraters alternating with such ball mills for removing from the ore the extracted values, means for conveying the ore to said ball mills and filters, means for supplying to the ball mills fresh amounts of solvent liquor, and means for recovering the metal values from the solutions obtained during the extraction; substantially as described.

16. The improved apparatus for extracting soluble metal values from ores comprising a series of crushing devices adapted to subject the ore to a series of combined crushing and extraction operations in the presence of a solvent liquor, means for removing from the ore after each such crushing operation, the solution formed therein, means for supplying to such crushing devices fresh amounts of solvent liquor, means for effecting the precipitation of metal values from the solutions and for recovering barren solutions adapted for further use, and means for returning such barren solution with further additions of solvent to the crushing devices; substantially as described.

17. The method of extracting metal values from ores, which comprises subjecting the ore to a plurality of similar treatment cycles each of which is substantially complete in itself and includes the steps of crushing the ore in the presence of the necessary amount of suitable solvent and thereby effecting a partial solution of the metal values during the contact of the solvent with the ore, replacing to a substantially complete degree the resulting pregnant solution by new solvent, and returning the resulting partially crushed and impoverished ore in contact with the required amount of new solvent to the next treatment cycle; substantially as described.

In testimony whereof I affix my signature.

CHARLES BIESEL.